US007001671B2

(12) United States Patent
Van Steenkiste et al.

(10) Patent No.: US 7,001,671 B2
(45) Date of Patent: Feb. 21, 2006

(54) KINETIC SPRAYED ELECTRICAL CONTACTS ON CONDUCTIVE SUBSTRATES

(75) Inventors: Thomas Hubert Van Steenkiste, Ray, MI (US); George Albert Drew, Warren, OH (US); Daniel William Gorkiewicz, Washington, MI (US); Bryan A. Gillispie, Warren, MI (US)

(73) Assignee: Delphi Technologies, Inc., Troy, MI (US)

( * ) Notice: Subject to any disclaimer, the term of this patent is extended or adjusted under 35 U.S.C. 154(b) by 57 days.

(21) Appl. No.: 10/676,393

(22) Filed: Oct. 1, 2003

(65) Prior Publication Data

US 2004/0072008 A1 Apr. 15, 2004

Related U.S. Application Data

(62) Division of application No. 09/974,243, filed on Oct. 9, 2001, now Pat. No. 6,685,988.

(51) Int. Cl.
*B32B 15/02* (2006.01)
*B32B 15/04* (2006.01)
*B32B 15/20* (2006.01)
*H01R 13/03* (2006.01)

(52) U.S. Cl. ...................... 428/614; 428/201; 428/674; 428/650; 428/646; 439/886; 439/887; 439/775

(58) Field of Classification Search ................ 428/614, 428/201, 206, 208, 209, 674, 646, 647, 648, 428/650, 651, 672; 439/207, 884, 886, 887, 439/877, 888, 889, 775
See application file for complete search history.

(56) References Cited

U.S. PATENT DOCUMENTS

| | | | | |
|---|---|---|---|---|
| 2,861,900 | A | 11/1958 | Smith et al. | 427/450 |
| 3,100,724 | A | 8/1963 | Rocheville | 118/308 |
| 3,876,456 | A | 4/1975 | Ford et al. | 502/245 |
| 3,993,411 | A | 11/1976 | Babcock et al. | 403/271 |
| 3,996,398 | A | 12/1976 | Manfredi | 427/451 |
| 4,263,335 | A | 4/1981 | Wagner et al. | 427/483 |
| 4,416,421 | A | 11/1983 | Browning et al. | 239/79 |
| 4,606,495 | A | 8/1986 | Stewart, Jr. et al. | 228/183 |
| 4,891,275 | A | 1/1990 | Knoll | 428/650 |
| 4,939,022 | A | 7/1990 | Palanisamy | 428/209 |
| 5,187,021 | A | 2/1993 | Vydra et al. | 428/607 |
| 5,217,746 | A | 6/1993 | Lenling et al. | 427/450 |
| 5,271,965 | A | 12/1993 | Browning | 427/446 |
| 5,302,414 | A | 4/1994 | Alknimov et al. | 427/192 |
| 5,308,463 | A | 5/1994 | Hoffmann et al. | 204/192.3 |

(Continued)

FOREIGN PATENT DOCUMENTS

DE 42 36 911 12/1993

(Continued)

OTHER PUBLICATIONS

Van Steenkiste, et al; *Kinetic Spray Coatings;* in Surface & Coatings Technology III; 1999, pp. 62-71, no month.

(Continued)

*Primary Examiner*—Michael E. Lavilla
(74) *Attorney, Agent, or Firm*—Scott A. McBain

(57) ABSTRACT

The present invention is directed to electrical contacts that comprise spaced electrically conductive particles embedded and bonded into the surface of conductors in which the particles have been kinetically sprayed onto the conductors with sufficient energy to form direct mechanical bonds between the particles and the conductors in a pre-selected location and particle number density that promotes high surface-to-surface contact and reduced contact resistance between the conductors.

19 Claims, 3 Drawing Sheets

U.S. PATENT DOCUMENTS

| | | | | |
|---|---|---|---|---|
| 5,328,751 | A | 7/1994 | Komorita et al. | 428/209 |
| 5,340,015 | A | 8/1994 | Hira et al. | 228/205 |
| 5,362,523 | A | 11/1994 | Gorynin et al. | 427/446 |
| 5,395,679 | A | 3/1995 | Myers et al. | 428/209 |
| 5,424,101 | A | 6/1995 | Atkins et al. | 427/448 |
| 5,464,146 | A | 11/1995 | Zalvzec et al. | 228/208 |
| 5,465,627 | A | 11/1995 | Garshelis | 73/862.335 |
| 5,476,725 | A | 12/1995 | Papich et al. | 428/654 |
| 5,493,921 | A | 2/1996 | Alasafi | 73/862.336 |
| 5,520,059 | A | 5/1996 | Garshelis | 73/862.335 |
| 5,525,570 | A * | 6/1996 | Chakraborty et al. | 502/326 |
| 5,527,627 | A | 6/1996 | Lautzenhiser et al. | 428/615 |
| 5,585,574 | A | 12/1996 | Sugihara et al. | 73/862.334 |
| 5,593,740 | A | 1/1997 | Strumbon et al. | 427/577 |
| 5,648,123 | A | 7/1997 | Kuhn et al. | 427/448 |
| 5,683,615 | A | 11/1997 | Munoz | 252/62.52 |
| 5,706,572 | A | 1/1998 | Garshelis | 29/602.1 |
| 5,708,216 | A | 1/1998 | Garshelis | 73/862.335 |
| 5,725,023 | A | 3/1998 | Padula | 137/596.17 |
| 5,795,626 | A | 8/1998 | Grabel et al. | 427/458 |
| 5,854,966 | A | 12/1998 | Kampe et al. | 419/67 |
| 5,887,335 | A | 3/1999 | Garshelis | 29/602.1 |
| 5,889,215 | A | 3/1999 | Kilmartin et al. | 75/862.335 |
| 5,894,054 | A | 4/1999 | Poruchuri et al. | 428/642 |
| 5,907,105 | A | 5/1999 | Pinkerton | 73/862.336 |
| 5,907,761 | A | 5/1999 | Tohma et al. | 428/553 |
| 5,952,056 | A | 9/1999 | Jordan et al. | 427/455 |
| 5,965,193 | A | 10/1999 | Ning et al. | 427/126.4 |
| 5,989,310 | A | 11/1999 | Chu et al. | 75/685 |
| 5,993,565 | A | 11/1999 | Pinkerton | 148/104 |
| 6,033,622 | A | 3/2000 | Maruyama | 419/35 |
| 6,042,894 | A * | 3/2000 | Goto et al. | 427/504 |
| 6,047,605 | A | 4/2000 | Garshelis | 73/862.336 |
| 6,051,045 | A | 4/2000 | Narula et al. | 75/233 |
| 6,051,277 | A | 4/2000 | Claussen et al. | 427/376.3 |
| 6,074,737 | A | 6/2000 | Jordan et al. | 428/312.8 |
| 6,098,741 | A | 8/2000 | Gluf | 180/421 |
| 6,119,667 | A | 9/2000 | Boyer et al. | 123/634 |
| 6,129,948 | A | 10/2000 | Plummet et al. | 427/202 |
| 6,139,913 | A * | 10/2000 | Van Steenkiste et al. | 427/191 |
| 6,145,387 | A | 11/2000 | Garshelis | 73/862.336 |
| 6,149,736 | A | 11/2000 | Sugihara | 148/301 |
| 6,159,430 | A | 12/2000 | Foster | 422/179 |
| 6,189,663 | B1 | 2/2001 | Smith et al. | 188/322.22 |
| 6,260,423 | B1 | 7/2001 | Garshelis | 73/862.336 |
| 6,261,703 | B1 | 7/2001 | Sasaki et al. | 428/627 |
| 6,283,386 | B1 | 9/2001 | Van Steenkiste et al. | 239/427 |
| 6,283,859 | B1 | 9/2001 | Carlson et al. | 463/36 |
| 6,289,748 | B1 | 9/2001 | Lin et al. | 73/862.331 |
| 6,338,827 | B1 | 1/2002 | Nelson et al. | 422/186.04 |
| 6,344,237 | B1 | 2/2002 | Kilmer et al. | 427/190 |
| 6,374,664 | B1 | 4/2002 | Bauer | 73/118.1 |
| 6,402,050 | B1 | 6/2002 | Kashirin et al. | 239/79 |
| 6,422,360 | B1 | 7/2002 | Oliver et al. | 188/266.5 |
| 6,424,896 | B1 | 7/2002 | Lin | 701/41 |
| 6,442,039 | B1 | 8/2002 | Schreiber | 361/760 |
| 6,446,857 | B1 | 9/2002 | Kent et al. | 228/139 |
| 6,465,039 | B1 | 10/2002 | Pinkerton et al. | 427/132 |
| 6,485,852 | B1 | 11/2002 | Miller et al. | 429/17 |
| 6,488,115 | B1 | 12/2002 | Ozsoylu | 180/444 |
| 6,490,934 | B1 | 12/2002 | Garshelis | 73/862.336 |
| 6,511,135 | B1 | 1/2003 | Ballinger et al. | 303/112 |
| 6,537,507 | B1 | 3/2003 | Nelson et al. | 422/186 |
| 6,551,734 | B1 | 4/2003 | Simpkins et al. | 429/26 |
| 6,553,847 | B1 | 4/2003 | Garshelis | 73/862.336 |
| 6,615,488 | B1 | 9/2003 | Anders | 29/890.053 |
| 6,623,704 | B1 | 9/2003 | Roth | 422/179 |
| 6,623,796 | B1 | 9/2003 | VanSteenkiste et al. | 427/189 |
| 6,624,113 | B1 | 9/2003 | LaBarge et al. | 502/344 |
| 2002/0071906 | A1 | 6/2002 | Rusch | 427/180 |
| 2002/0073982 | A1 | 6/2002 | Shaikh et al. | 123/688 |
| 2002/0102360 | A1 | 8/2002 | Subramanian et al. | 427/419.1 |
| 2002/0110682 | A1 | 8/2002 | Brogan et al. | 428/325 |
| 2002/0112549 | A1 | 8/2002 | Cheshmehdoost et al. | 73/862.333 |
| 2002/0182311 | A1 | 12/2002 | Leonardi et al. | 427/128 |
| 2003/0039856 | A1 | 2/2003 | Gillispie et al. | 428/650 |
| 2003/0190414 | A1 | 10/2003 | VanSteenkiste | 427/201 |
| 2003/0219542 | A1 | 11/2003 | Ewasyshyn et al. | 427/180 |

FOREIGN PATENT DOCUMENTS

| | | |
|---|---|---|
| DE | 199 59 515 | 6/2001 |
| DE | 100 37 212 | 1/2002 |
| DE | 101 26 100 | 12/2002 |
| EP | 1 160 348 | 12/2001 |
| EP | 1245854 A2 | 2/2002 |
| JP | 55031161 | 3/1980 |
| JP | 61249541 | 11/1986 |
| JP | 04180770 | 6/1992 |
| JP | 04243524 | 8/1992 |
| WO | 98/22639 | 5/1998 |
| WO | 02/052064 | 1/2002 |
| WO | 03009934 | 2/2003 |

OTHER PUBLICATIONS

Liu, et al; *Recent Development in the Fabricationof Metal Matrix-Particulate Composites Using Powder Metallurgy Techniques;* in Journal of Material Science 29' 1994; pp. 1999-2007; National University of Singapore, Japan, no month.

Papyrin; *The Cold Gas-Dynamic Spraying Method a New Method for Coatings Deposition Promises a New Generation of Technologies;* Novosibirsk, Russia, no date.

McCune, et al; Characterization of Copper and Steel Coatings Made by the Cold Gas-Dynamic Spray Method; National Thermal Spray Conference, 1996 no month.

Alkhimov, et al; *A Method of "Cold" Gas-Dynamic Deposition; Sov. Phys. Kokl. 36* (Dec. 12, 1990; pp. 1047-1049).

Dykuizen, et al; *Impact of High Velocity Cold Spray Particles;* in Journal of Thermal Spray Technology 8 (4); 1999 pp. 559-564, no month.

Swartz, et al; *Thermal Resistance At Interfaces;* Applied Physics Letter, vol. 51, No. 26, Dec. 28, 1987; pp. 2201-2202.

Davis, et al; *Thermal Conductivity of Metal-Matrix Composites;* J. Applied Physics 77 (10), May 15, 1995; pp. 4494-4960.

Stoner, et al; *Measurements of the Kapitza Conductance Between Diamond and Several Metals;* Physical Review Letters, vol. 68, No. 10; Mar. 9, 1992; pp. 1563-1566.

Stoner, et al; *Kapitza Conductance and Heat Flow Between Solids at Temperatures from 50 to 300K;* Physical Review B, vol. 48, No. 22, Dec. 1, 1993—II; pp. 16374-16387.

Johnson, et al; *Diamond/ Al Metal Matrix Composites Formed by the Pressureless Metal Infiltration Process;* J. Mater, Res., vol. 8, No. 5, May 1993; pp. 11691173.

Rajan, et al; *Reinforcement Coatings and Interfaces in Aluminum Metal Matrix Composites;* pp. 3491-3503, 1998, no month.

*LEC Manufacturing and Engineering Components;* Lanxide Electronic Components, Inc., no date.

Dykuizen, et al.; *Gas Dynamic Principles of Cold Spray;* Journal of Thermal Spray Technology; Jun. 1998; pp. 205-212.

McCune, et al; *An Exploration of the Cold Gas-Dynamic Spray Method for Several Materials Systems,* no date.

Ibrahim, et al; *Particulate Reinforced Metal Matrix Composites—A Review; Journal of Materials Science 26;* pp. 1137-1156, 1991, no month.
I.J. Garshelis, et al; *A Magnetoelastic Torque Transducer Utilizing a Ring Divided into Two Oppositely Polarized Circumferential Regions;* MMM 1995; Paper No. BB-08, no month.
I.J. Garshelis, et al; *Development of a Non-Contact Torque Transducer for Electric Power Steering Systems;* SAE Paper No. 920707; 1992; pp. 173-182, no month.
Boley, et al; *The Effects of Heat Treatment on the Magnetic Behavior of Ring—Type Magnetoelastic Torque Sensors;* Proceedings of Sicon '01; Nov. 2001.
J.E. Snyder, et al; *Low Coercivity Magnetostrictive Material with Giant Piezomagnetic d33,* Abstract Submitted for the MAR99 Meeting of the American Physical Society, no date.
Pavel Ripka, et al; *Pulse Excitation of Micro-Fluxgate Sensors,* IEEE Transactions on Magnetics, vol. 37, No. 4, Jul. 2001, pp. 1998-2000.
Trifon M. Liakopoulos, et al; *Ultrahigh Resolution DC Magnetic Field Measurements Using Microfabricated Fluxgate Sensor Chips,* University of Cincinnati, Ohio, Center for Microelectronic Sensors and MEMS, Dept. of ECECS pp. 630-631, no date.
Derac Son, *A New Type of Fluxgate Magnetometer Using Apparent Coercive Field Strength Measurement,* IEEE Transactions on Magnetics, vol. 25, No. 5, Sep. 1989, pp. 3420-3422.
O. Dezauri, et al; *Printed Circuit Board Integrated Fluxgate Sensor,* Elsevier Science S. A. (2000) Sensors and Actuators, pp. 200-203, no month.
How, et al; *Generation of High-Order Harmonics in Insulator Magnetic Fluxgate Sensor Cores,* IEEE Transactions on Magnetics, vol. 37, No. 4, Jul. 2001, pp. 2448-2450.
Moreland, *Fluxgate Magnetometer,* Carl W. Moreland, 199-2000, pp. 1-9, no month 2002.
Ripka, et al; *Symmetrical Core Improves Micro-Fluxgate Sensors,* Sensors and Actuators, Version 1, Aug. 25, 2000, pp. 1-9.
Hoton How, et al; *Development of High-Sensitivity Fluxgate Magnetometer Using Single-Crystal Yttrium Iron Garnet Thick Film as the Core Material, ElectroMagnnetic Applications, Inc.,* no date.
Ripka, et al; *Microfluxgate Sensor with Closed Core,* submitted for Sensors and Actuators, Version 1, Jun. 17, 2000.
Henriksen, et al; *Digital Detection and Feedback Fluxgate Magnetometer,* Meas. Sci. Technol. 7 (1996) pp. 897-903.
Cetek 930580 Compass Sensor, *Specifications*, Jun. 1997.
Geyger, *Basic Principles Characteristics and Applications,* Magnetic Amplifier Circuits, 1954, pp. 219-232, no month.
European Search Report dated Jan. 29, 2004 and it's Annex.

* cited by examiner

KINETIC SPRAYED ELECTRICAL CONTACTS ON CONDUCTIVE SUBSTRATES

This is a division of application Ser. No. 09/974,243 filed on Oct. 9, 2001, now U.S. Pat. No. 6,685,988.

TECHNICAL FIELD

The present invention is directed to electrical contacts that comprise spaced particles embedded into the surface of conductors in which the particles have been kinetically sprayed onto the conductors with sufficient energy to form direct mechanical bonds between the particles and the conductors in a pre-selected location and particle number density that promotes high surface-to-surface contact and reduced contact resistance between the conductors. The method of making such electrical contacts is also provided.

INCORPORATION BY REFERENCE

U.S. Pat. No. 6,139,913, "Kinetic Spray Coating Method and Apparatus," is incorporated by reference herein.

BACKGROUND OF THE INVENTION

Most electrical contacts are copper or copper alloy conductors with a tin-plated surface layer. The tin surface layer is a single continuous layer directly bonded to a clean non-oxidized copper substrate in order to promote maximum conductance between conductors while limiting resistance from the tin-copper metallic bond. Tin is used as a surface layer since it is substantially softer than copper and may be recurrently wiped to provide a fresh de-oxidized surface for metal-to-metal connection between conductors.

Electrical contacts have been traditionally made by electroplating a layer of tin to copper substrates followed by stamping out individual conductors. The copper substrates must be cleaned prior to placement in the electroplating bath to remove any oxidized surface layers that may otherwise create additional electrical resistance. The substrates are coated to a thickness of about 3 to 5 microns of tin.

Because most electrical contacts undergo repeated connections and reconnections, increasing the thickness of the tin surface layer correlates well with the longevity and durability of the contact. However, due to processing limitations and increased frictional properties, the threshold thickness for electroplating tin onto copper is about 5 microns.

While it may be possible to use other available coating methods to increase coating thickness, methods that rely on melting and/or depositing the tin in a molten state are undesirable because, unless conducted in the absence of oxygen, they will introduce significant oxidation into the tin surface layer. Also, due to the increased costs of use, such methods are not practical.

One of the main problems with present electrical contacts is debris build-up due to fretting on the contact surface. With relative movement of mated electrical contacts, a small portion of the oxidized surface layer is rubbed away to expose a fresh electrical connection surface. The portion rubbed away usually does not flake off, but instead remains adjacent to the contact point and begins to create a build-up of oxidized debris. It is well known that this oxidized debris becomes a source for additional resistance and degradation of the contact's conductance.

Prior to the present invention, removal of this debris has been impractical. In the prior art, the solution has been to provide continuous layer coatings that have been believed to result in maximum surface area for conductance.

A new technique for producing coatings by kinetic spray, or cold gas dynamic spray, was recently reported in an article by T. H. Van Steenkiste et al., entitled "Kinetic Spray Coatings," published in Surface and Coatings Technology, vol. 111, pages 62–71, Jan. 10, 1999. The article discusses producing continuous layer coatings having low porosity, high adhesion, low oxide content and low thermal stress. The article describes coatings being produced by entraining metal powders in an accelerated air stream and projecting them against a target substrate. It was found that the particles that formed the coating did not melt or thermally soften prior to impingement onto the substrate.

This work improved upon earlier work by Alkimov et al. as disclosed in U.S. Pat. No. 5,302,414, issued Apr. 12, 1994. Alkimov et al. disclosed producing dense continuous layer coatings with powder particles having a particle size of from 1 to 50 microns using a supersonic spray.

The Van Steenkiste article reported on work conducted by the National Center for Manufacturing Sciences (NCMS) to improve on the earlier Alkimov process and apparatus. Van Steenkiste et al. demonstrated that Alkimov's apparatus and process could be modified to produce kinetic spray coatings using particle sizes of greater than 50 microns and up to about 106 microns.

This modified process and apparatus for producing such larger particle size kinetic spray continuous layer coatings is disclosed in U.S. Pat. No. 6,139,913, Van Steenkiste et al., that issued on Oct. 31, 2000. The process and apparatus provide for heating a high pressure air flow up to about 650° C. and accelerating it with entrained particles through a de Laval-type nozzle to an exit velocity of between about 300 m/s (meters per second) to about 1000 m/s. The thus accelerated particles are directed toward and impact upon a target substrate with sufficient kinetic energy to impinge the particles to the surface of the substrate. The temperatures and pressures used are sufficiently lower than that necessary to cause particle melting or thermal softening of the selected particle. Therefore, no phase transition occurs in the particles prior to impingement.

SUMMARY OF THE INVENTION

The present invention is directed to kinetic spraying electrically conductive materials onto conductive substrates. More particularly, the present invention is directed to electrical contacts that comprise spaced electrically conductive particles embedded into the surface of conductors in which the particles have been kinetically sprayed onto the conductors with sufficient energy to form direct mechanical bonds between the particles and the conductors in a pre-selected location and particle number density that promotes high surface-to-surface contact and reduced contact resistance between the conductors. The particle number density, as used herein, defines the quantity of spaced particles deposited within a selected location.

Utilizing the apparatus disclosed in U.S. Pat. No. 6,139,913, the teachings of which are incorporated herein by reference, it was recognized that thick continuous layer coatings could be produced on conductive substrates in the production of electrical contacts. Such thick coatings are practical due to the mechanical bonds that are formed by impact impingement of the particles onto the substrate. These thicker continuous layer coatings are beneficial in producing electrical contacts since they provide low porosity, low oxide, low residual stress coatings that result in electrical contacts having greater longevity and durability.

When the feed rate of the particles into the gas stream is reduced, it is difficult to maintain a uniform output of particles necessary to form a continuous layer. The production of a continuous layer of particles is even more problematic if the substrate is moved across the nozzle or vice versa.

The present inventors used this process to embed a large number of spaced apart particles in the surface of conductors to provide multiple contact points that are particularly useful for electrical contacts. A large number of spaced particles embedded in the surface of the conductors provide a structure having a surface layer with a plurality of particles forming ridges and valleys. Each embedded particle defines a ridge, and the space in between particles defines a valley. The ridges provide multiple contact points for conductance while the spaces provide multiple avenues for the removal of debris produced from repeated fretting. Thus the discontinuous nature of the particle coating caused by the method of application leads to an electrically conductive contact that can with stand repeated fretting, as discussed further below.

In addition, the present invention provides the means for controlling the location of deposition of kinetic sprayed particles and the particle number density deposited in that location on the conductive substrate by simply controlling the feed rate of particles into the gas stream and the traverse speed of the substrate across the apparatus and/or nozzle. By doing so, the spray of conductive materials is controlled so that particles are only deposited on those portions that are to be stamped out as conductors.

This provides a tremendous advantage in processing. It substantially reduces waste of the conductive particles and aids in the reuse of substrate materials. Furthermore, there are no plating bath waste products or associated disposal costs.

In a typical coating procedure it is necessary to pre-clean the surface that is to be coated to remove the oxide layer, the present process eliminates this step. The impact of the initial kinetic sprayed particles on the surface is sufficiently forceful to fracture any oxide layer on the surface. The subsequent particles striking the now cleaned surface stick. As a result, electrical contacts produced by kinetic spraying spaced electrically conductive particles are particularly useful.

The present invention provides that particles can be kinetic sprayed onto conductors with sufficient energy to form direct mechanical bonds between the particles and the conductors in a pre-selected location and particle number density that promotes high surface-to-surface contact between the conductors with reduced contact resistance.

DESCRIPTION OF THE PREFERRED EMBODIMENT

An electrical contact of the present invention preferably has a contact resistance of less than about 10 milli-ohms and more preferably less than about 2 milli-ohms (when measured with a 1 Newton load and a 1.6 mm radius gold probe per ASTM B667). However, it is well recognized that electrical contacts of any contact resistance fall within the scope of the invention. The electrical contact comprises first and second mated conductors. While more than two conductors may be used to form an electrical contact, two are preferred. The conductors are stamped out of conductive substrates made of any suitable conductive material including, but not limited, to copper, copper alloys, aluminum, brass, stainless steel and tungsten. It is preferred, however, that the substrate be made of copper.

In each contact of the present invention, at least one of the conductors comprises a plurality of spaced particles that have been embedded into the surface of the conductor in a pre-selected location and particle number density. As contemplated, the spaced particles are embedded and bonded into the surface using the kinetic spray process as described herein and as further generally described in U.S. Pat. No. 6,139,913 and the Van Steenkiste et al article ("Kinetic Spray Coatings," published in Surface and Coatings Technology, Vol. III, pages 62–71, Jan. 10, 1999), both of which are incorporated herein by reference.

The particles may be selected from any electrically conductive particle. Due to the impact of the particle on the substrate, it has been found that it is no longer necessary to select the particle from a material that is softer than the material being selected for the conductors. Any electrically conductive particle, including mixtures thereof, may be used in the present invention, including for example, particles comprising monoliths, composites and alloys. Suitable monolithic conductive particles include, for example, tin, silver, gold, and platinum; suitable composite particles include, for example, metal/metal composites of metals that do not easily form alloys; and suitable alloys include, for example, alloys of tin, such as tin-copper, tin-silver, tin-lead and the like. In the present invention, tin or mixtures with tin are preferred. It has been found that particles having a nominal diameter of about 25 microns to about 106 microns are suitable, but the preferred range has a nominal diameter of greater than about 50 microns and more preferably have a nominal diameter of about 75 microns.

Each embedded particle, due to the kinetic impact force, flattens into a nub-like structure with an aspect ratio of about 5 to 1, reducing in height to about one third of its original diameter. The nubs are discontinuous and define ridges for conductance when mating the conductors and the spaces in between the nubs define valleys for removal of debris produced from the rubbing, or "fretting," that occurs from relative movement between mated contacts.

Figure 1:
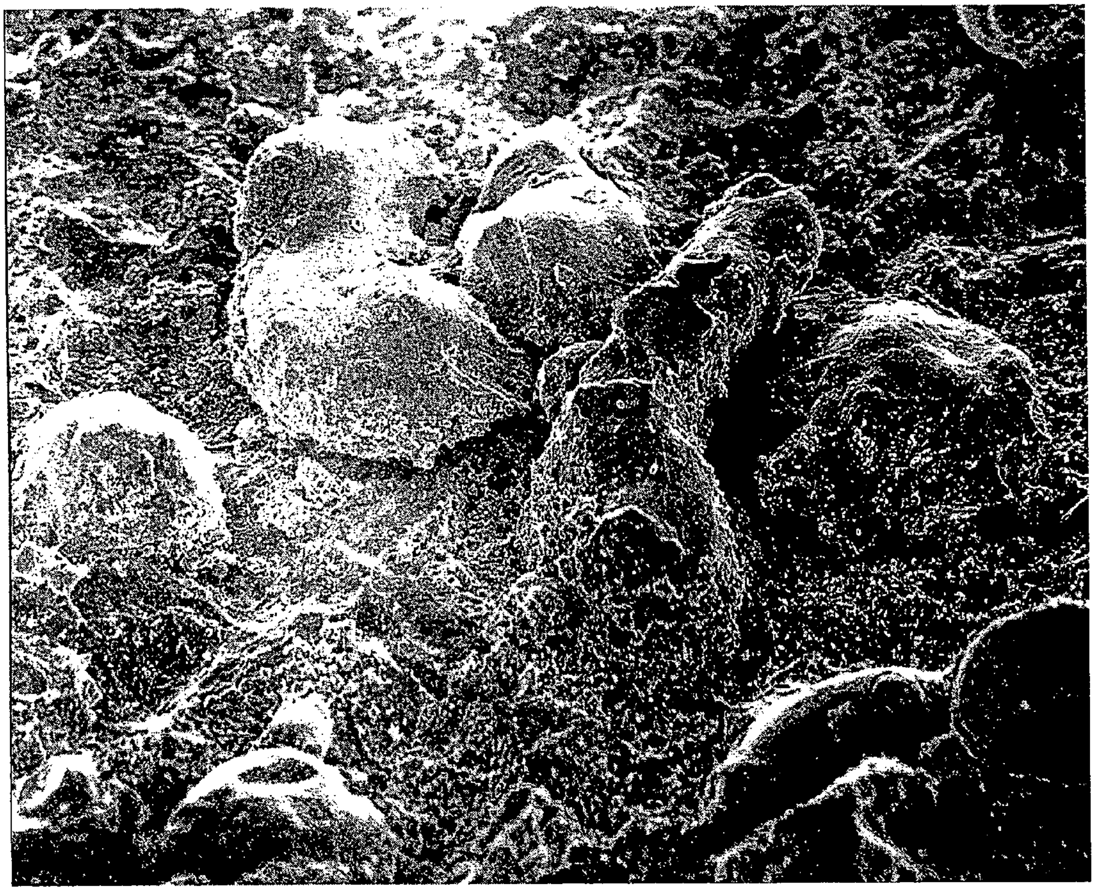
FIG. 1 is a scanning electron micrograph of an electrical contact of the present invention comprising a copper conductor with kinetic sprayed tin particles, having an original particle diameter of about 50 to 65 microns, embedded on its surface.

A scanning electron micrograph of the surface of an electrical contact of the present invention is shown in FIG. 1. The lumps (or nubs) are the tin particles and the substrate is copper. The original particle size was about 50 to 65 microns.

Electrical contacts of the present invention are preferably made using the apparatus disclosed in U.S. Pat. No. 6,139,913. However, the process used is modified from that disclosed in the prior patent in order to achieve the discontinuous layer of particles contemplated in the present invention. The operational parameters are modified to obtain an exit velocity of the particles from the de Laval-type nozzle of between about 300 m/s (meters per second) to less than about 1000 m/s. The substrate is also moved in relation to the apparatus and/or the nozzle to provide movement along the surface of the substrate at a traverse speed of about 1 m/s to about 10 m/s, and preferably about 2 m/s, adjusted as necessary to obtain the discontinuous particle layer of the present invention. The particle feed rate may also be adjusted to obtain the desired particle number density. The temperature of the gas stream is also modified to be in the range of about 100° C. to about 550° C., ie. lower than in a typical kinetic spray process. More preferably, the temperature range is from 100° C. to 300° C., with about 200° C. being the most preferred operating temperature especially for kinetic spraying tin onto copper.

It will be recognized by those of skill in the art that the temperature of the particles in the gas stream will vary depending on the particle size being kinetic sprayed and the main gas stream temperature. Since these temperatures are substantially less than the melting point of the original particles, even upon impact, there is no change of the solid phase of the original particles due to transfer of kinetic and thermal energy, and therefore no change in their original physical properties.

In a preferred embodiment of the present invention, the electrical contact has a contact resistance of about 1 to 2 milli-ohms and comprises first and second mating copper conductors. Each of these copper conductors further comprises a plurality of spaced tin particles kinetic sprayed onto the surface of the conductors in a pre-selected location and particle number density. The kinetic sprayed particles have an original nominal particle diameter of about 75 microns and are embedded into the surface of each conductor forming a direct metallic bond between the tin and copper. The direct bond is formed when the kinetic sprayed particle impacts the copper surface and fractures the oxidized surface layer and subsequently forms a direct metal-to-metal bond between the tin particle and the copper substrate. Each embedded tin particle has a nub-like shape with the average height of each particle being about 25 microns from the surface of the copper substrate.

In the preferred process for making electrical contacts of the invention using the apparatus disclosed in U.S. Pat. No. 6,139,913, tin particles are introduced into a focused air stream, pre-heated to about 200° C., and accelerated through a de Laval-type nozzle to produce an exit velocity of about 300 m/s (meters per second) to less than about 1000 m/s. The entrained particles gain kinetic and thermal energy during transfer. The particles are accelerated through the nozzle as the surface of a copper substrate begins to move across the apparatus and/or nozzle at a traverse speed of about 2 m/s within a pre-selected location on the substrate that approximates the shape of the copper conductor contemplated to be stamped out of the copper substrate. While the pattern of particle deposition is random, the location and particle number density are controlled. Upon exiting the nozzle, the tin particles are directed and impacted continuously onto the copper substrate forming a plurality of spaced electrically conductive particles. Upon impact the kinetic sprayed particles transfer substantially all of their kinetic and thermal energy to the copper substrate, fracturing any oxidation layer on the surface of the copper substrate while simultaneously mechanically deforming the tin particle onto the surface. Immediately following fracture, the particles become embedded and mechanically bond the tin to the copper via a metallic bond. The resulting deformed particles have a nub-like shape with an aspect ratio of about 5 to 1.

Figure 2:
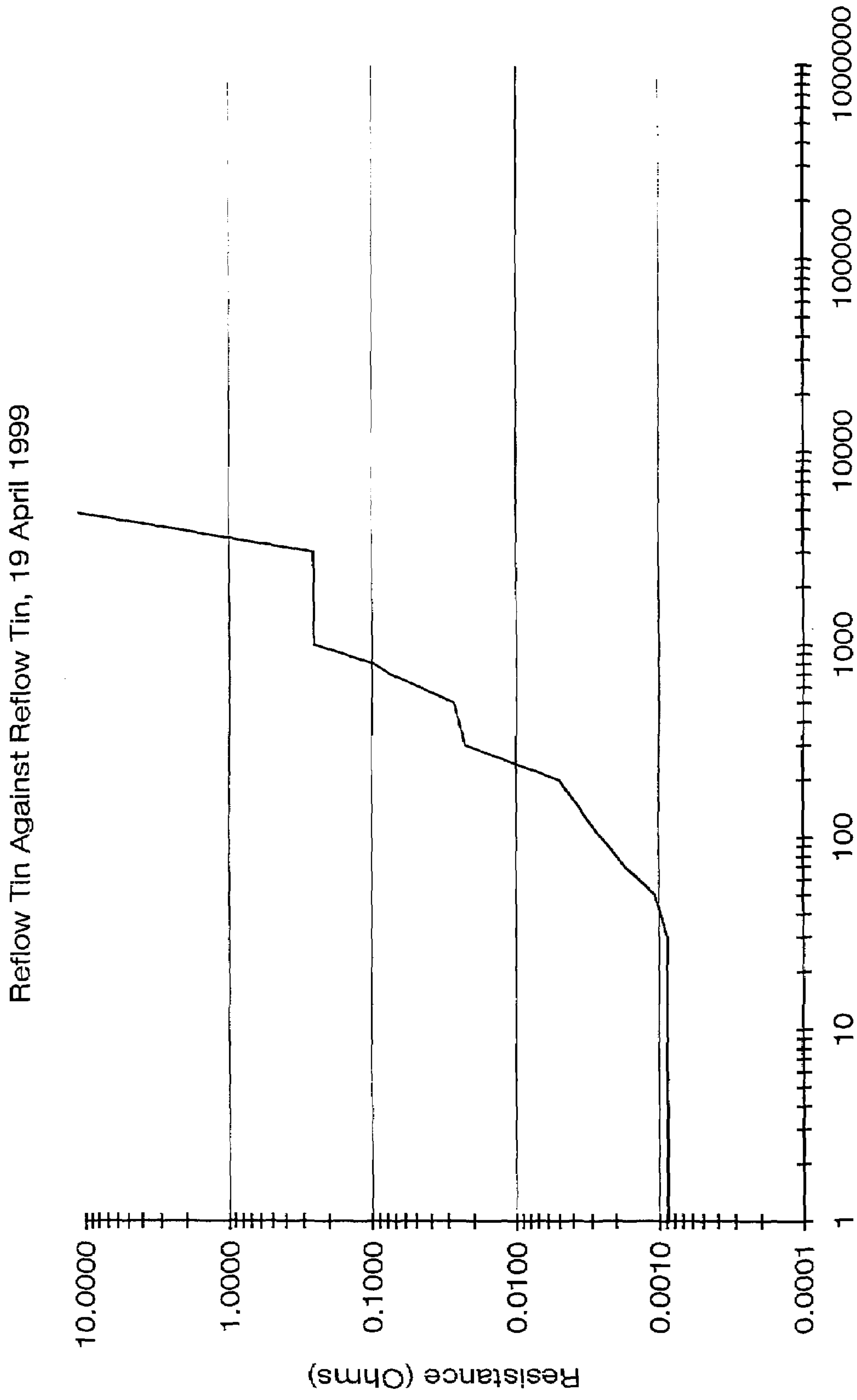
FIG. 2 is a chart that shows the contact resistance as a function of fretting cycles of a prior art electroplated tin electrical contact.
Figure 3:
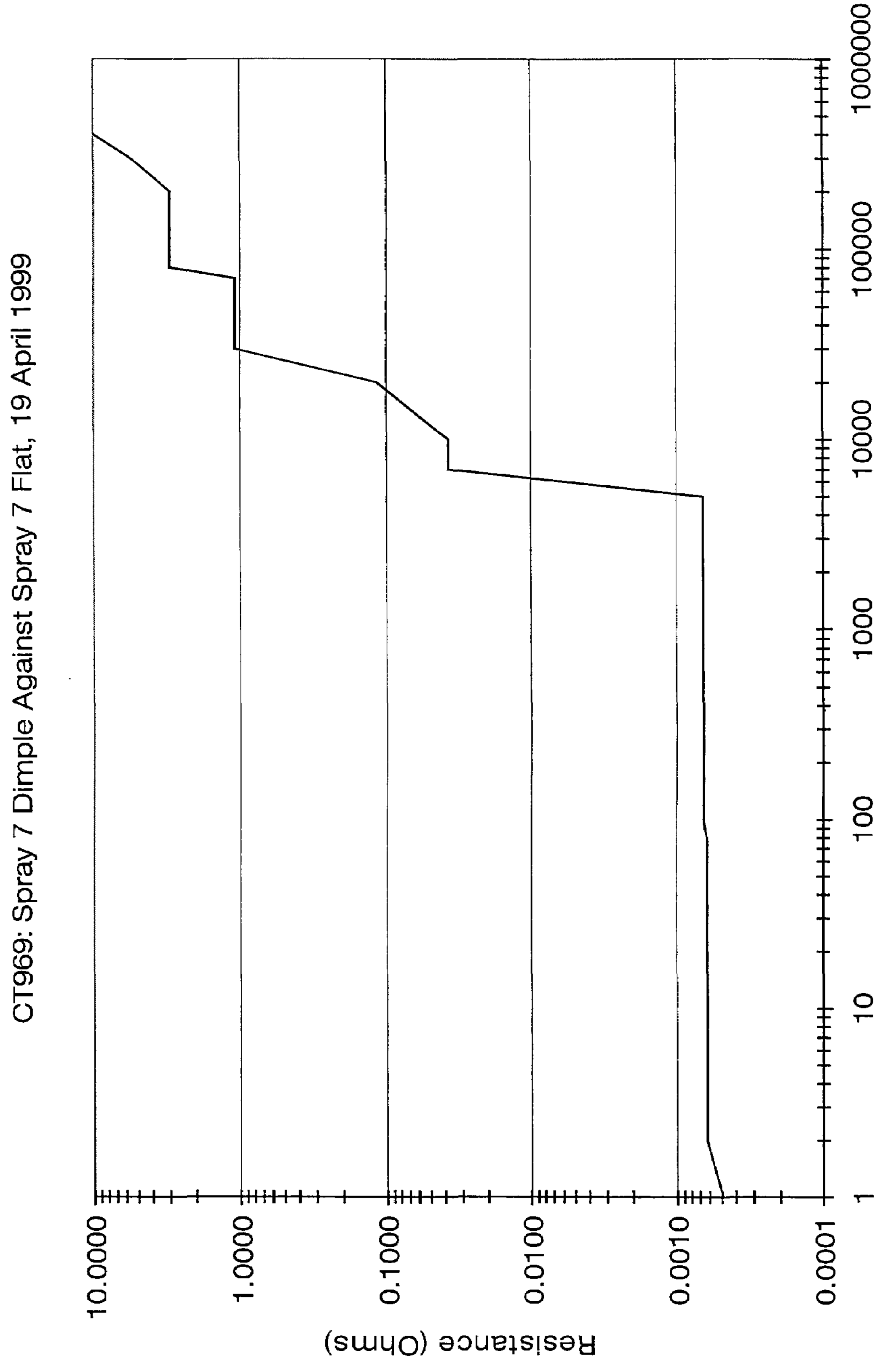
FIG. 3 is a chart that shows the contact resistance as a function of fretting cycles of a tin-copper electrical contact made according to the present invention.

Performance results of an electrical contact produced according to the present invention and a standard electroplated contact are depicted in FIGS. 2 and 3. FIG. 2 shows the contact resistance as a function of fretting cycles of a prior art electrical contact having two copper conductors electroplated with tin. The electroplating forms a continuous layer as opposed to the discontinuous layer formed by the present process. The results show that the contact initially maintained a resistance of less than about 1 milli-ohm for the first 50 cycles, but then resistance began increasing to reach about 10 milli-ohms at about 120 cycles and over 100 milli-ohms at about 1000 cycles. FIG. 3 shows the contact resistance as a function of fretting cycles of a tin-copper electrical contact made according to the present invention in which two copper conductors were kinetic sprayed with tin particles. The results show that the contact initially maintained a resistance of less than about 1 milli-ohm for about 5000 cycles before resistance began increasing. As demonstrated by FIGS. 2 and 3, the present invention can produce improved electrical contacts that maintain a low resistance over time.

The table that follows shows other representative results of electrical contacts produced according to the present invention. Contact resistance was tested according to the industry standard. The spots were randomly selected and the contact resistance in mili Ohms is shown for each spot (NT=not tested). The temperature indicated was the temperature of the pre-heated air stream.

| | | CONTACT RESISTANCE | | | | | | |
|---|---|---|---|---|---|---|---|---|
| Sample | Load (g) | Spot 1 (mΩ) | Spot 2 (mΩ) | Spot 3 (mΩ) | Spot 4 (mΩ) | Spot 5 (mΩ) | Average (mΩ) | Standard Deviation |
| 801a | 100 | 1.43 | 0.85 | 1.62 | 1.17 | 0.88 | 1.19 | 0.34 |
| (150° C.) | 200 | 0.76 | 0.52 | 1.15 | 0.80 | 0.57 | 0.78 | 0.23 |
| 801b | 100 | 0.92 | 0.91 | 0.86 | 0.99 | 1.17 | 0.97 | 0.12 |
| (200° C.) | 200 | 0.62 | 0.60 | 0.64 | 0.55 | 0.82 | 0.67 | 0.09 |
| 901a | 100 | 1.14 | 1.00 | 1.30 | 1.20 | 1.75 | 1.28 | 0.29 |
| (150° C.) | 200 | NT | NT | 0.85 | 0.90 | 1.20 | 0.98 | 0.19 |
| 901b | 100 | 2.19 | 0.89 | 0.89 | 0.95 | 1.36 | 1.26 | 0.56 |
| (100° C.) | 200 | NT | NT | NT | NT | NT | NT | |

While the preferred embodiment of the present invention has been described so as to enable one skilled in the art to practice the electrical contacts of the present invention, it is to be understood that variations and modifications may be employed without departing from the concept and intent of the present invention as defined in the following claims. The preceding description is intended to be exemplary and should not be used to limit the scope of the invention. The scope of the invention should be determined only by reference to the following claims.

What is claimed is:

1. An electrical connector comprising:

a first surface formed from a first electrically conductive material and embedded on said surface a plurality of spaced apart particles of a second electrically conductive material, said particles having a nominal pre-embedded diameter of greater than 50 microns and forming a discontinuous layer raised on said surface with said second electrically conductive material being other than said first electrically conductive material and with said electrical connector having a contact resistance of less than 10 milli-Ohms.

2. The electrical connector of claim 1 wherein said first surface is made from a metal comprising at least one of copper, aluminum, brass, stainless steel or tungsten.

3. The electrical connector of claim 1 wherein said particles comprise at least one of tin, silver, gold, platinum, metal alloys, or mixtures thereof.

4. The electrical connector of claim 3 wherein said particles comprise tin or mixtures of tin and any other metal.

5. The electrical connector of claim 4 wherein said particles comprise alloys of at least one of tin-copper, tin-silver, or tin-lead.

6. The electrical connector of claim 1 wherein said particles have a nominal pre-embedded diameter of greater than 75 microns.

7. The electrical connector of claim 1 wherein said electrical connector has a contact resistance of less than 2 milli-Ohms.

8. The electrical connector of claim 1 wherein said embedded particles have an aspect ratio of 5 to 1.

9. The electrical connector of claim 1 wherein said embedded particles have an average height of equal to or less than 25 microns above the first surface.

10. An electrical connection comprising: a first connector having a first surface formed from a first electrically conductive material and embedded on said surface a plurality of spaced apart particles of a second electrically conductive material, said particles having a nominal pre-embedded diameter of greater than 50 microns and forming a discontinuous layer raised on said surface with said second electrically conductive material being other than said first electrically conductive material; and a second connector releasably engaged with the first connector, thereby forming said electrical connection.

11. The electrical connection of claim 10 wherein said first surface is made from a metal comprising at least one of copper, aluminum, brass, stainless steel or tungsten.

12. The electrical connection of claim 10 wherein said particles comprise at least one of tin, silver, gold, platinum, metal alloys, or mixtures thereof.

13. The electrical connection of claim 12 wherein said particles comprise tin or mixtures of tin and any other metal.

14. The electrical connection of claim 13 wherein said particles comprise alloys of at least one of tin-copper, tin-silver, or tin-lead.

15. The electrical connection of claim 10 wherein said particles have a nominal pre-embedded diameter of greater than 75 microns.

16. The electrical connection of claim 10 wherein said electrical connector has a contact resistance of less than 10 milli-Ohms.

17. The electrical connection of claim 10 wherein said electrical connector has a contact resistance of less than 2 milli-Ohms.

18. The electrical connection of claim 10 wherein said embedded particles have an aspect ratio of 5 to 1.

19. The electrical connector of claim 10 wherein said embedded particles have an average height of equal to or less than 25 microns above the first surface.

* * * * *